(12) United States Patent
Haruki et al.

(10) Patent No.: US 7,247,118 B2
(45) Date of Patent: Jul. 24, 2007

(54) LIMITED SLIP DIFFERENTIAL DEVICE

(75) Inventors: Yuya Haruki, Isehara (JP); Masaaki Fusegi, Tochigi (JP)

(73) Assignees: Nissan Motor Co., Ltd., Yokohama-shi (JP); GKN Driveline Torque Technology KK, Tochigi-shi (JP)

( * ) Notice: Subject to any disclaimer, the term of this patent is extended or adjusted under 35 U.S.C. 154(b) by 221 days.

(21) Appl. No.: 11/048,769

(22) Filed: Feb. 3, 2005

(65) Prior Publication Data

US 2005/0187063 A1 Aug. 25, 2005

(30) Foreign Application Priority Data

Feb. 25, 2004 (JP) ............... 2004-049009

(51) Int. Cl.
*F16H 48/06* (2006.01)
*H01F 7/08* (2006.01)

(52) U.S. Cl. ................ 475/231; 335/279

(58) Field of Classification Search ........... 192/84.1, 192/84.92, 84.9, 69.8, 69.81; 475/231; 310/12, 310/14, 23, 30, 34; 335/270, 279, 281, 296
See application file for complete search history.

(56) References Cited

U.S. PATENT DOCUMENTS

| | | | | |
|---|---|---|---|---|
| 4,539,542 A * | 9/1985 | Clark | ......... | 335/261 |
| 4,604,600 A * | 8/1986 | Clark | ......... | 335/261 |
| RE32,860 E * | 2/1989 | Clark | ......... | 335/261 |
| 5,208,570 A * | 5/1993 | Nippert | ......... | 335/261 |
| 5,234,265 A * | 8/1993 | Tyler | ......... | 303/118.1 |
| 6,769,524 B2 * | 8/2004 | Yasui et al. | ......... | 192/35 |
| 2003/0162622 A1 * | 8/2003 | Fusegi et al. | ......... | 475/231 |
| 2006/0052207 A1 * | 3/2006 | Teraoka | ......... | 475/231 |

* cited by examiner

*Primary Examiner*—Roger Pang
*Assistant Examiner*—Justin K. Holmes
(74) *Attorney, Agent, or Firm*—Foley & Lardner LLP

(57) ABSTRACT

A limited slip differential device has differential gears, a clutch to limit the differential function of the differential gears, and a electromagnetic solenoid including a plunger and a coil. The plunger is set to move forward to engage the clutch by electromagnetic force of the coil in a differential limit state and move backward by a return spring to disengage said clutch in a differential limitless state. The plunger contacts with a contacting member in at least one state of the differential limit state and the differential limitless state, and their contact area is set smaller than a facing area between them in at least the one state.

9 Claims, 7 Drawing Sheets

PRIOR ART

LIMITED SLIP DIFFERENTIAL DEVICE

BACKGROUND OF THE INVENTION

1. Field of the Invention

The present invention relates to a limited slip differential device that is capable of limiting its differential function by using an electromagnetic solenoid.

2. Description of the Related Art

A limited slip differential device of this kind is disclosed in Japanese utility model laying-open publication No. (Hei) 05-29833. This differential device has differential gears consisting of a planetary gear set, a differential limit mechanism to limit differential function of the differential gears, and a housing containing the differential gears and the limit slip differential mechanism. The differential limit mechanism includes a multi-plate clutch and an electromagnetic clutch mechanism having a magnet plate, an electromagnetic solenoid to attract the magnet plate, and a clutch disposed between the magnet plate and the electromagnet solenoid. In this differential device, the solenoid controls a slip-limit state of the differential gears by changing the amount of coupling force applied to the multi-plate clutch according to the amount of electric current supplied to the solenoid.

The above known conventional limited slip differential device, however, encounters a problem that the differential device keeps the slip-limit state at times due to remanent magnetization in a yoke of the electromagnetic clutch mechanism despite of de-energizing the solenoid.

It is, therefore, an object of the present invention to provide a limited slip differential device which overcomes the foregoing drawbacks and can ensure to disengage a clutch for limiting a differential function of differential gears when an electromagnetic solenoid is de-energized.

SUMMARY OF THE INVENTION

According to a first aspect of the present invention there is provided a limited slip differential device comprising: differential gears to obtain a differential function; a clutch to limit the differential function of the differential gears; a electromagnetic solenoid that has a plunger moving forward to engage said clutch in a differential limit state and moving backward to disengage the clutch in a differential limitless state, and a coil applying electromagnetic force to the plunger when the coil is energized in the differential limit state, and the plunger being pressed by a return spring so that the clutch is disengaged; and a contacting member to which the plunger is contactable in at least one state of the differential limit state and the differential limitless state, wherein a contact area between the plunger and the contacting member is set smaller than a facing area between the plunger and the contacting member in at least the one state of the differential limit state and the differential limitless state.

BRIEF DESCRIPTION OF THE DRAWINGS

The objects, features and advantages of the present invention will become apparent as the description proceeds when taken in conjunction with the accompanying drawings, in which:

FIG. 3C is an enlarged view showing a contact portion between the plunger and the yoke having a large area which increases remanent magnetization in the yoke;

DETAILED DESCRIPTION OF THE PREFERRED EMBODIMENTS

Figure 1:
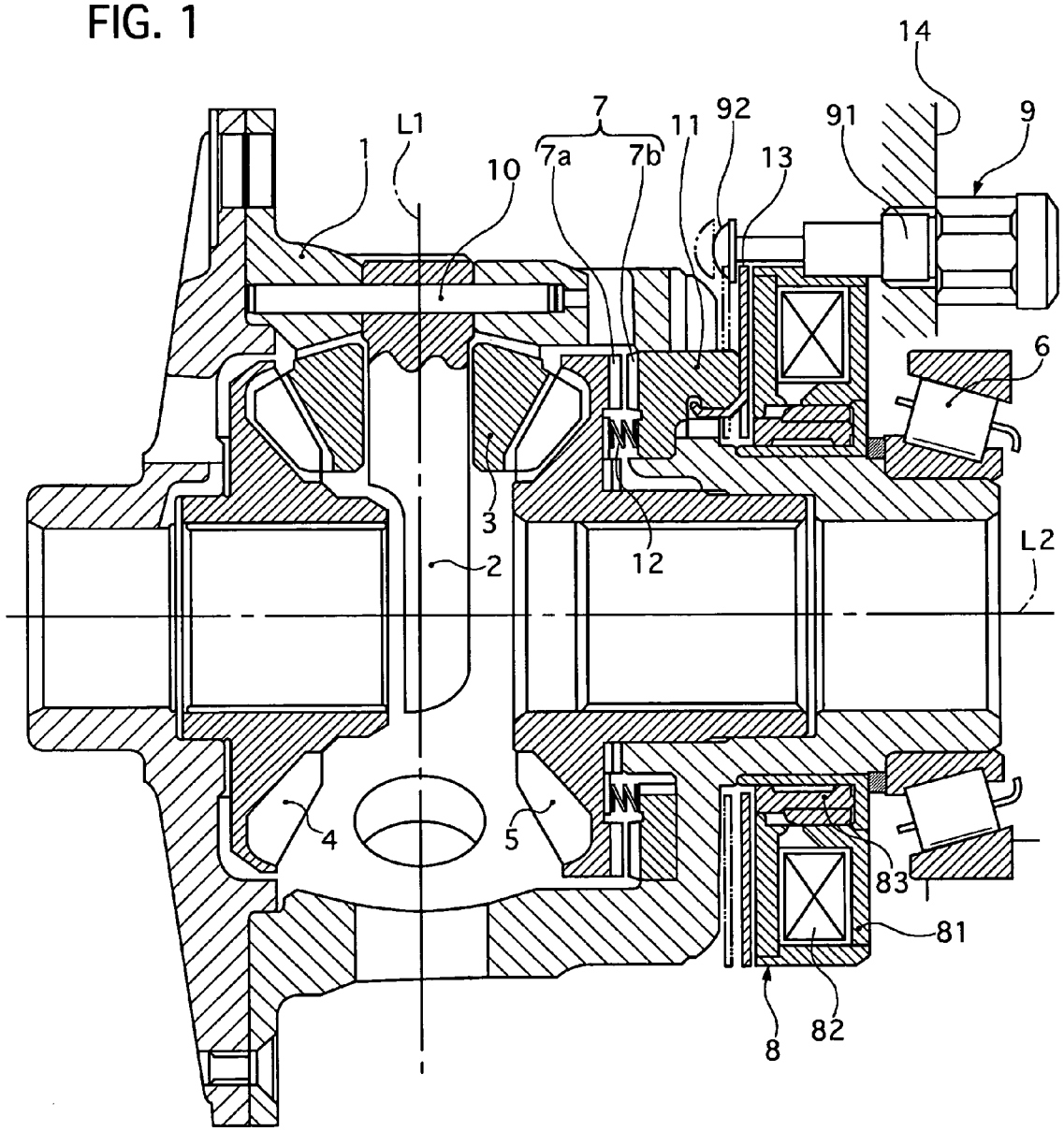
FIG. 1 is a cross sectional view showing a limit slip differential device of a first embodiment according to the present invention.

Throughout the following detailed description, similar reference characters and numbers refer to similar elements in all figures of the drawings, and their descriptions are omitted for eliminating duplication.

Referring to FIG. 1 of the drawing, there is shown a first preferred embodiment of a limited slip differential device according to the present invention.

The limit slip differential device includes differential gears and a differential limit mechanism to limit a differential function of the differential gears.

The differential gears have a pair of differential pinions 3, one of which is omitted in FIG. 1, and a pair of side gears 4 and 5. The differential pinions 3 are arranged in opposite positions and rotatably supported by a pinion shaft 2 which is fixed with a differential case 1 by using a pin 10. A part of the pinion shaft 2 is omitted in FIG. 1. The side gears 4 and 5 which are arranged in opposite positions and mesh with the differential pinions 3. A rotation axis L1 of the differential pinions 3 and a rotation axis L2 of the side gears 4 and 5 are arranged in an orthogonal relation with each other. The side gears 4 and 5 are splined with a not-shown left and right drive shafts, respectively.

The differential case 1 contains the differential gears and is provided with a not-shown ring gear driven by a not-shown drive pinion so that driving torque is inputted to the ring gear from an engine, not shown. The ring gear and the drive pinion makes up a final drive so as to receive an output from a transmission and give one last gear reduction to a power-train of a motor vehicle. The differential case 1 is rotatably supported at its both end portions to, for example, a vehicle body 14 through tapered roller bearings 6, one of which is omitted in FIG. 1.

The differential limit mechanism is constructed as follows.

The differential limit mechanism is provided with a dog clutch 7 including a teethed portion 7a of the side gear 3 and a teethed portion 7b of a piston 11 so that the teethed portions 7a and 7b can engage with each other in a differential-lock position. The teethed portion 7a is formed at an outer peripheral backside of the side gear 5, and the teethed portion 7b is formed at a side-gear side on the clutch piston 11. The piston 11 formed with the teethed portion 7b is supported rotatably around and slidably along the rotation axis L2 by the differential case 1. The piston 11 is biased to move away from the side gear 5 by a return spring 12 disposed in an inner space formed between the side gear 5 and the piston 5 so that the teethed portions 7a and 7b can be disengaged from each other in a differential un-lock position of the differential limit mechanism.

The clutch piston 11 is attached at its back side with a circular piston plate 13 by hooking inner claw portions of the plate 13 on rear projecting portions of the piston 11, and accordingly they move together along the rotation axis L2. Behind the inner portion of the piston plate 13, a linear electromagnetic solenoid 8 is located so that its plunger 83 can move forward along the rotation axis L2 to push the plate 13 and engage the dog clutch 7 when the solenoid 8 is energized in the differential-lock position. The outer peripheral portion of the piston plate 13 is set to contact with a catch portion 92 of a differential lock sensor 9.

The differential lock sensor 9 includes a main body 91 fixed to the vehicle body 14 and the catch portion 92 moving together with the piston plate 13 to detect based on a position of the catch portion 92 whether or not the dog clutch 7 is engaged.

Figure 2A:
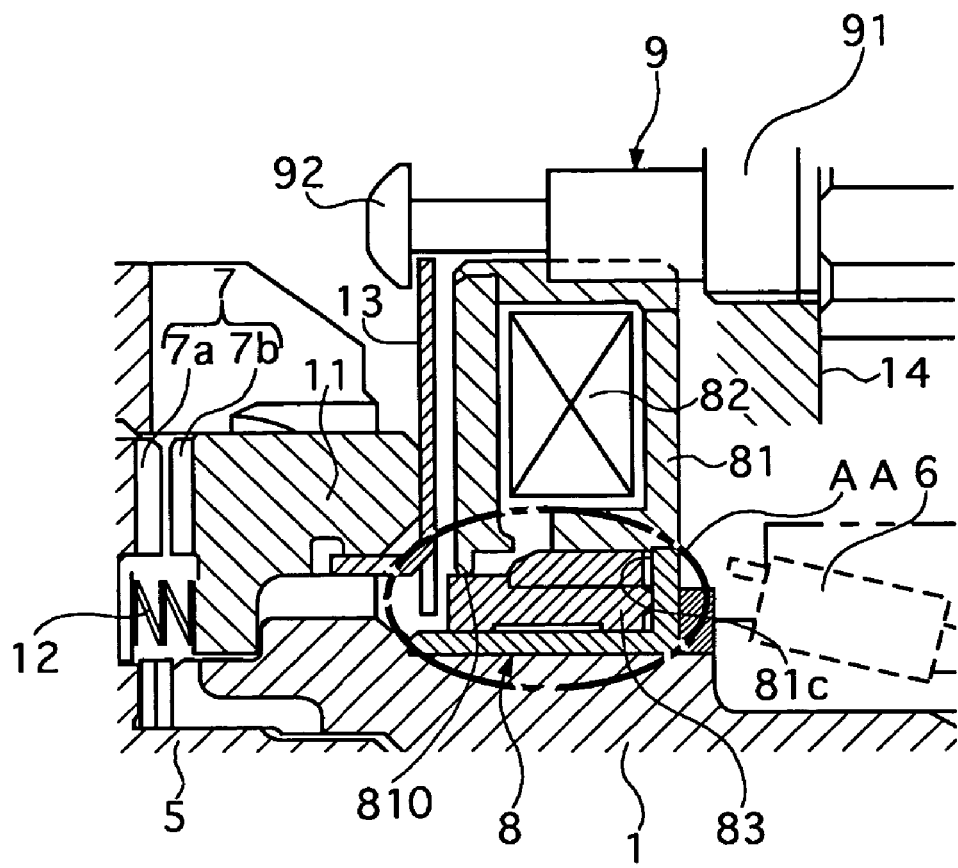
FIG. 2A is an enlarged cross sectional view showing a differential limit mechanism of the limit slip differential device of the first embodiment shown in FIG. 1.

FIG. 2A is an enlarged view showing the differential limit mechanism shown in FIG. 1.

As shown in FIG. 2, the linear electromagnetic solenoid 8 includes a yoke 81 to transmit magnetic flux, a coil 82 to generate electromagnetic force, and the plunger 83 to move according to the electromagnetic force generated by the coil 82. The yoke 81 corresponds to a contacting member of the present invention.

The yoke 81 is arranged behind the piston plate 13 and has a circular shape such that it contains the coil at its outer peripheral portion and is formed at its center portion with a hole 810 surrounded by an inner stepped portion having an inner radial surface 81a and an inner cylindrical surface 81b.

Figure 2B:
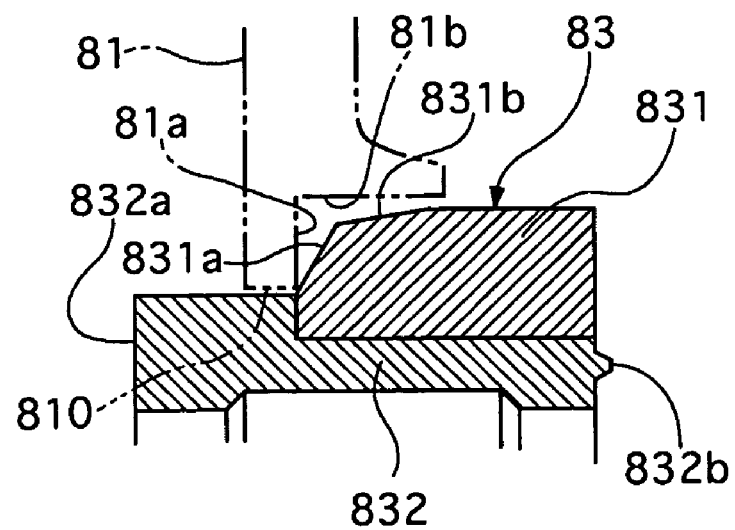
FIG. 2B is an enlarged view showing a part indicated by a circle area AA in FIG. 2A.

The plunger 83 is rotatably around and slidably along the rotation axis L2. The plunger 83 is, as shown in FIG. 2B, constructed of an outer ring part 831 and an inner ring part 832, which are joined with each other by press-fit or the like.

The outer ring part 831 is shorter in length than the inner ring part 832 so that a front portion of the inner ring part 832 projects forward with respect to the outer ring portion 831. The outer ring part 831 is formed at its front side with a first steep tapered surface 831a and a second gradual tapered surface 831b following the first tapered surface 831a by cutting off a front end portion thereof. This cutting off is performed so that the first tapered surface 831a of the outer ring part 831 contacts the inner radial surface 81a of the yoke 81 in an area smaller than a main portion 831c of the outer ring portion 831. The contact area is preferably set to be the smallest as possible, ensuring its strength. A diameter of the outer ring part 831 is set larger than that of the hole 810 of the yoke 81. The second tapered surface 831b is kept away from the inner cylindrical surface 81b of the yoke 81 in the differential lock position. The first and second tapered surfaces 831a and 831b correspond to a tapered surface of the present invention.

The inner ring part 832 is formed at its frond end side with a pressing surface 832a contactable to the piston plate 13 in the differential lock position and at its rear end side with a circular projecting portion 832b contactable to an inner rear wall portion 81c of the yoke 81 in the differential unlock position. The projecting portion 832b is formed by cutting off the rear portion of the inner ring part 832 so that it contacts the inner rear wall portion 81c of the yoke 81 in an area smaller than a main portion 832c of the inner ring part 832. The diameter of the inner ring part 832 is set smaller than that of the hole 810 so as to be inserted into the hole 810, so that an outer surface of a front portion of the inner ring part 832 does not contact with an inner edge of the inner radial surface 81a of the yoke 81 in the differential lock position.

As described above, the front and rear contact areas between the ring parts 831 and 832 of the plunger 83 and the yoke 81 are set smaller than the main portions of the ring parts 831 and 832, respectively. This comes from the following reason.

Figure 3A:
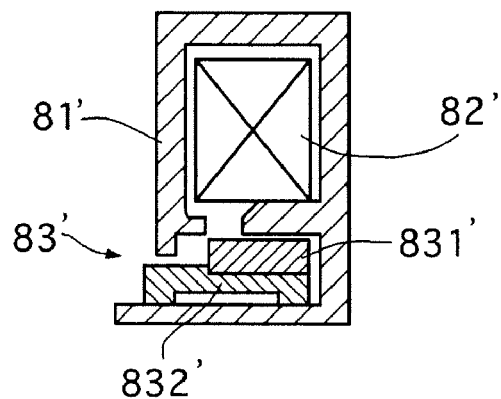
FIGS. 3A and 3C are diagrams illustrating relationships between a plunger having a configure different from that of the first embodiment and a yoke of an electromagnetic solenoid in a differential unlock state and in a differential lock state, respectively.
Figure 3B:
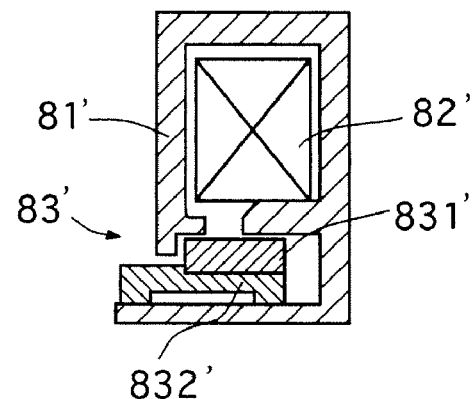

FIGS. 3A and 3B show a differential limit mechanism in a differential unlock state and in a differential lock state, respectively, when the differential limit mechanism is constructed to have a plunger without a cut-off portion, for the sake of comparison with the differential limit mechanism 8 with the cut-off portions of the first embodiment.

Figure 3C:
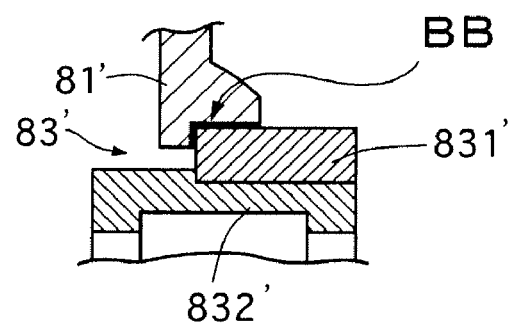

The differential limit mechanism 8' includes a yoke 81', a coil 82' disposed inside the yoke 81', and a plunger 831'. The plunger 831' has an outer ring part 831' and an inner ring part 832' as well as those of the first embodiment, except that they are not cut-off at their front and rear ends. In the differential unlock state, the coil 82' is de-energized, and the plunger 83' is pressed back by a return spring, not shown, to contact with a rear inner wall portion 81c' of the yoke 82' and disengage a dog clutch as shown in FIG. 3A. In the differential lock state, the coil 82' is energized, and the plunger moves forward to push a piton plate, not shown, to engage the dog clutch, not shown, as shown in FIG. 3B. In these states, a front or rear end of the plunger 83' contacts with the yoke 81' at least occasionally or sometimes. Their contact areas become large, because the plunger 83 requires a sufficient volume to generate necessary thrust force due to electromagnetic force for engaging the dog clutch 7. For example, as shown in FIG. 3C, the contact area BB between the front end of the outer ring part 831' and the yoke 81' is substantially equal to the area where the outer ring part 831' faces to an inner radial surface 81a' and an inner cylindrical surface 81b' of the yoke 81'. This large area contact causes high remanent magnetization in the yoke 81', applying large attracting force between the plunger 83' and the yoke 81' despite of de-energizing the coil 82' and preventing disengagement of the dog clutch.

In order to avoid the above problem, set force of the return spring may be set larger, which needs a larger coil to generate stronger thrust force for overcoming the return spring and engaging the dog clutch, resulting in a higher cost and a larger size.

In contrast, the plunger 83 of the first embodiment is cut off at its front and rear ends so as to contact with the yoke 81 in the smaller area, which can reduce attracting force applying between them due to the remanent magnetization in the yoke 81. Therefore, the return spring 12 can be smaller in strength, which enables the return spring 12 and the linear electromagnetic solenoid 8 to decrease in their dimension and cost, ensuring disengagement of the dog clutch 7 by return force of the return spring 12. Cutting off is obtained by machining, sintered alloy, or the like.

The operation of the limited slip differential device of the first embodiment will be described.

In the differential unlock state, the coil 82 of the linear electromagnetic solenoid 8 is not supplied with electric current, and accordingly the return spring 12 push back the piston 11 with the teethed portion 7b to disengage the dog clutch 7. Output torque outputted from the engine is transmitted to the ring gear through the transmission and the drive pinion, and rotates the differential case 1 connected with the ring gear. The torque is further transmitted to the pinion shaft 2 and the differential pinions 3, and then to the side gears 4 and 5 to drive the right and left wheels through the drive shafts. In this state, the side gears 4 and 5 are free from the differential case 1, because the dog clutch is disengaged. This gives a differential function between the right and left wheels.

In the differential lock state, the coil 82 of the linear electromagnetic solenoid 8 is supplied with the electric current to engage the dog clutch 7. Specifically, the plunger 83 moves forward due to magnetic force against spring force of the return spring 12 and press the piston plate 13 and piston 11 to engage the teethed portions 7a and 7b of the dog clutch 7. This brings the side gears 4 and 5 to be locked to the differential case 1, limiting the differential function. The output torque from the engine is transmitted to the drive wheels similarly to the above torque transmission in the differential unlock state, while the side gears 4 and 5 and the differential case 1 are kept under restraint to rotate as a unit, with completely limiting the differential function. Accordingly, for example, when one of the wheels slips on a low frictional road surface, a part of driving torque of the wheel on the low frictional road surface is transmitted to the wheel on a high frictional road surface through the dog clutch 7, resulting in a high torque at the wheel on a high frictional road surface. This enables the motor vehicle to creep out from this road surface area.

The differential lock state and the differential unlock state correspond to a differential limit state and a differential limitless state of the present invention, respectively.

The limited slip differential device of the first embodiment has advantages listed below.

The small contact area between the plunger 83 and the yoke 81 decreases the remanent magnetization in the yoke 81, which enables the return spring 12 to be smaller in strength and the linear electromagnetic solenoid 8 to be decreased in their dimension and cost, ensuring disengagement of the dog clutch 7 by return force of the return spring 12.

The small contact area can be easily obtained by cutting off the front end portion of the plunger 83 to form the tapered surface 831a to contact with the yoke 81.

The contact area can be smaller by forming the second tapered surface 831b separated away from the yoke 81 in the differential lock position.

The contact area can be obtained by cutting off the rear end portion to form the circular projecting portion 832b to contact the yoke 81.

Using the return spring 12 ensures the disengagement of the dog clutch 7 when the coil 82 is de-generated.

Next, a limited differential device of a second embodiment will be described with reference to the accompanying drawing of FIG. 4.

This differential device has a structure equipped with differential gears, a dog clutch, and a linear electromagnetic solenoid, which are similar to that of the first embodiment except configurations of a plunger and a yoke of a linear electromagnetic solenoid.

Figure 4:
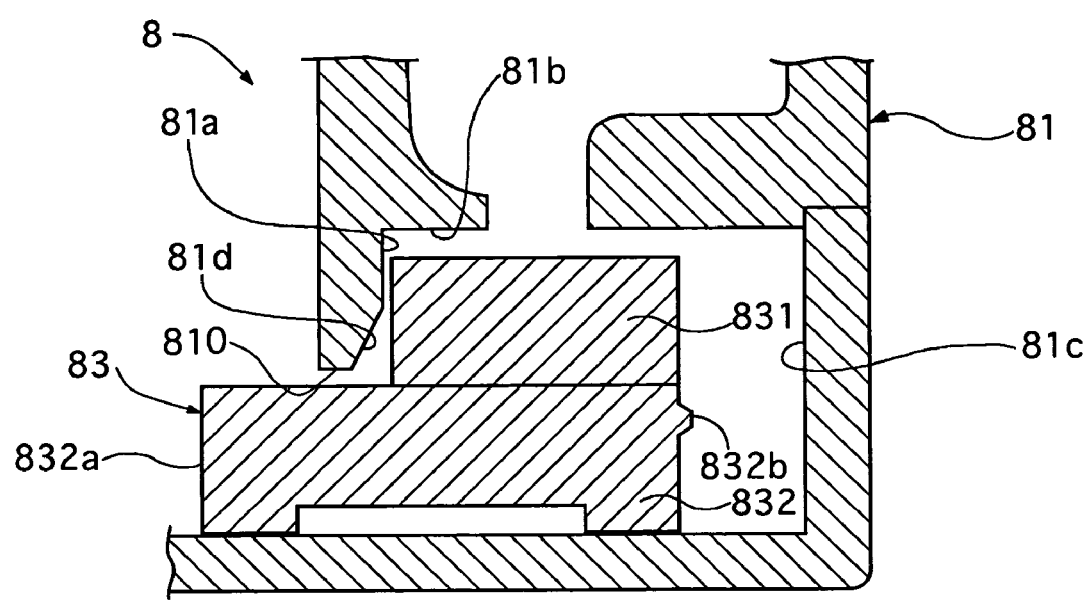
FIG. 4 is a cross sectional view showing a plunger and a yoke of a differential limit mechanism used in a limit slip differential device of a second embodiment according to the present invention.

As shown in FIG. 4, a plunger 83 includes an outer ring part 831 and an inner ring part 832, which are joined with each other by press fit or the like. The outer ring part 831 has not a first and outer tapered portion such as those of the first embodiment, while a yoke 81 is formed at its center portion with a hole 810 surrounded by an inner stepped portion having an inner tapered surface 81d, an inner radial surface 81a, and an inner cylindrical surface 81b by cutting off an inner portion of the yoke 81. The inner tapered surface 81d is kept away from the outer ring part 831 when the outer ring part 831 contacts with the inner radial surface 81a in a differential lock position, which decreases a contacting area between the plunger 83 and the yoke 81. The inner cylindrical surface 81b is set to be larger in diameter than an outer surface of the outer ring part 831, which causes a clearance between them. This brings further reduction of the contact area between the plunger 83 and the yoke 81, thereby decreasing remanent magnetization in the yoke 8. The other parts of the limited slip differential device with the electromagnetic solenoid are similar to those of the first embodiment shown in FIGS. 1 and 2.

The operation and advantages of the limited slip differential device will be described.

The differential gears and the dog clutch act similarly to the first embodiment. The dog clutch is controlled by the electromagnetic solenoid to shift between a differential unlock state and a differential lock state.

In the differential unlock state, a coil of the electromagnetic solenoid is de-energized, so that the plunger 83 is pressed back by a return spring to contact with an inner rear wall portion 81c of the yoke 81. The return spring ensures disengagement of the dog clutch, obtaining a differential function. The plunger 83 contacts at its circular projecting portion 832b formed at a rear side of the plunger 83 with the inner rear wall portion 81c, which can reduce remanent magnetization in the yoke 8.

In the differential lock state, the coil is energized so that the plunger 83 moves forward against spring force of the return spring and press a piston with a teethed portion to engage the dog clutch. The plunger 83 contacts with inner radial surface 81a of the yoke 81, with being separated away from the inner tapered surface 81d and the inner cylindrical surface 81b, which brings a small contact area between the plunger 83 and the yoke 81. Therefore, the remanent magnetization in the yoke 8 is reduced, allowing the return spring to be decreased in strength and dimension, and thereby this enables the electromagnetic solenoid to be reduced in its cost and dimension. In addition, the inner tapered surface 81d, the inner radial surface 81a, and the inner cylindrical surface 81b can be easily obtained at low cost by cutting off the inner portion of the yoke 81.

Next, a limited differential device of a third embodiment will be described with reference to the accompanying drawing of FIG. 5.

This differential device has a structure equipped with differential gears, a dog clutch, and a linear electromagnetic solenoid, which are similar to that of the first embodiment except configurations of a plunger and a yoke of a linear electromagnetic solenoid.

Figure 5:
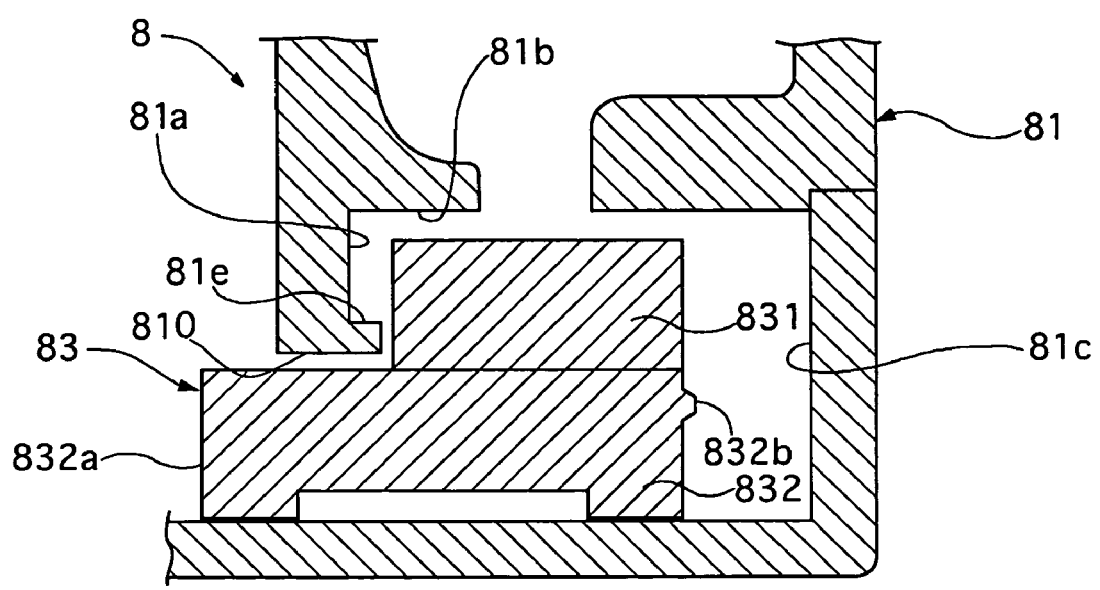
FIG. 5 is a cross sectional view showing a plunger and a yoke of a differential limit mechanism used in a limit slip differential device of a third embodiment according to the present invention.

As shown in FIG. 5, a plunger 83 includes an outer ring part 831 and an inner ring part 832, which are joined with each other by press fit or the like. The outer ring part 831 has not a first and outer tapered portion such as those of the first embodiment, while a yoke 81 is formed at its center portion with a hole 810 surrounded by an inner stepped portion having an inner circular projecting portion 81e, an inner radial surface 81a, and an inner cylindrical surface 81b by cutting off an inner portion of the yoke 81. The inner circular projecting portion 81e contacts with an outer ring part 831 of the plunger 83 in a differential lock position, while the inner radial surface 81a and the inner cylindrical surface 81b are always separated away from an outer surface of the outer ring part 831 of the plunger 83.

The other parts are similar to those of the first embodiment. The operation and advantages of the limited slip differential device of the third embodiment will be described.

The differential gears and the dog clutch act similarly to the first embodiment. The dog clutch is controlled by the electromagnetic solenoid to shift between a differential unlock state and a differential lock state.

In the differential unlock state, a coil of the electromagnetic solenoid is de-energized, so that the plunger 83 is pressed back by a return spring to contact with an inner rear wall portion 81c of the yoke 81. The return spring ensures disengagement of the dog clutch, obtaining a differential function. The plunger 83 contacts at its circular projecting portion 832b formed at a rear side of the plunger 83 with the inner rear wall portion 81c, which can reduce remanent magnetization in the yoke 8.

In the differential lock state, the coil is energized so that the plunger 83 moves forward against spring force of a return spring and press a piston with a teethed portion to engage the dog clutch. The plunger 83 contacts with inner circular projecting portion 81e of the yoke 81, with being separated away from the inner radial surface 81a and the inner cylindrical surface 81b, which brings a small contact area between the plunger 83 and the yoke 81. Therefore, the remanent magnetization in the yoke 8 is reduced, allowing the return spring to be decreased in strength and dimension, and thereby this enables the electromagnetic solenoid to be reduced in its cost and dimension. In addition, the inner circular projecting portion 81e, the inner radial surface 81a, and the inner cylindrical surface 81b can be easily obtained at low cost by cutting off the inner portion of the yoke 81.

Next, a limited differential device of a fourth embodiment will be described with reference to the accompanying drawing of FIG. 6.

This differential device has a structure equipped with differential gears, a dog clutch, and a linear electromagnetic solenoid, which are similar to that of the first embodiment except configurations of a plunger and a yoke of a linear electromagnetic solenoid.

Figure 6:
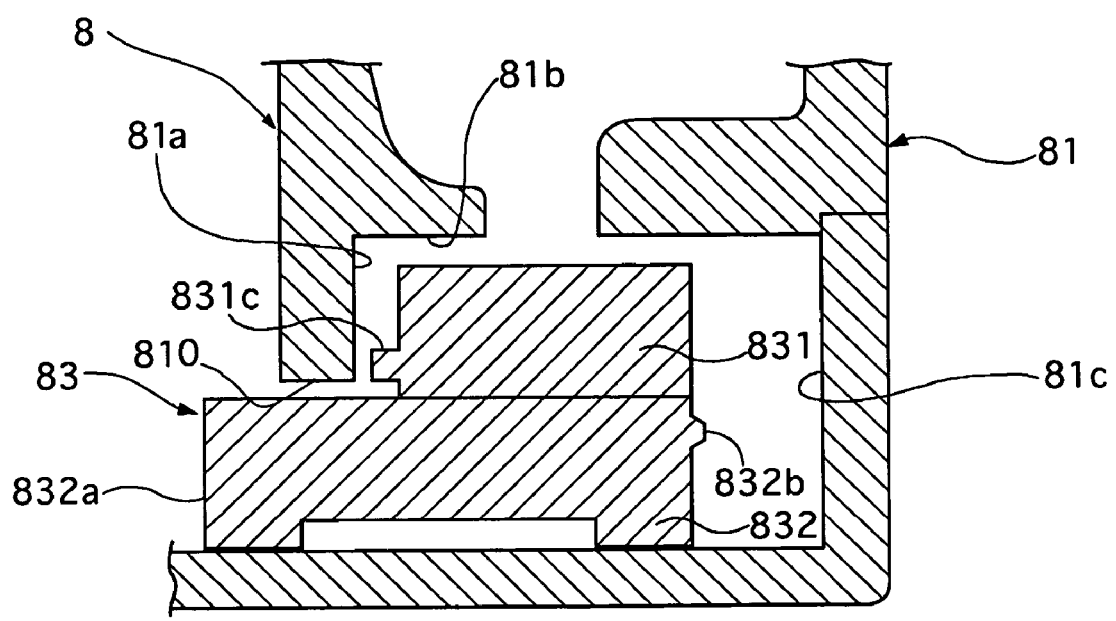
FIG. 6 is a cross sectional view showing a plunger and a yoke of a differential limit mechanism used in a limit slip differential device of a fourth embodiment according to the present invention.

As shown in FIG. 6, a plunger 83 includes an outer ring part 831 and an inner ring part 832, which are joined with each other by press fit or the like. The outer ring part 831 has at its front end a circular projecting portion 831c instead of a first and outer tapered portion of the first embodiment by cutting off a front end portion of the plunger 83. The circular projecting portion 831c of the plunger 83 contacts with an inner radial surface 81a of the yoke 81 in a differential lock position, while an inner cylindrical surface 81b of the yoke 81 is always separated away from an outer surface of the outer ring part 831 of the plunger 83. The other parts are similar to those of the first embodiment.

The operation and advantages of the limited slip differential device of the fourth embodiment will be described.

The differential gears and the dog clutch act similarly to the first embodiment. The dog clutch is controlled by the electromagnetic solenoid to shift between a differential unlock state and a differential lock state.

In the differential unlock state, a coil of the electromagnetic solenoid is de-energized, so that the plunger 83 is pressed back by a return spring to contact with an inner rear wall portion 81c of the yoke 81. The return spring ensures disengagement of the dog clutch, obtaining a differential function. The plunger 83 contacts at its circular projecting portion 832b formed at a rear side of the plunger 83 with the inner rear wall portion 81c, which can reduce remanent magnetization in the yoke 8.

In the differential lock state, the coil is energized so that the plunger 83 moves forward against spring force of a return spring and press a piston with a teethed portion to engage the dog clutch. The plunger 83 contacts at its circular projecting portion 831c with the radial surface 81a of the yoke 81, with being separated away from the inner cylindrical surface 81b, which brings a small contact area between the plunger 83 and the yoke 81. Therefore, the remanent magnetization in the yoke 8 is reduced, allowing the return spring to be decreased in strength and dimension, and thereby this enables the electromagnetic solenoid to be reduced in its cost and dimension. In addition, the circular projecting portion 831c of the plunger 83, the inner radial surface 81a and the inner cylindrical surface 81b of the yoke 81 can be easily obtained at low cost by cutting off the front end portion of the plunger 83 and the inner portion of the yoke 81, respectively.

While there have been particularly shown and described with reference to preferred embodiments thereof, it will be understood that various modifications may be made therein, and it is intended to cover in the appended claims all such modifications as fall within the true spirit and scope of the invention.

Figure 2C:
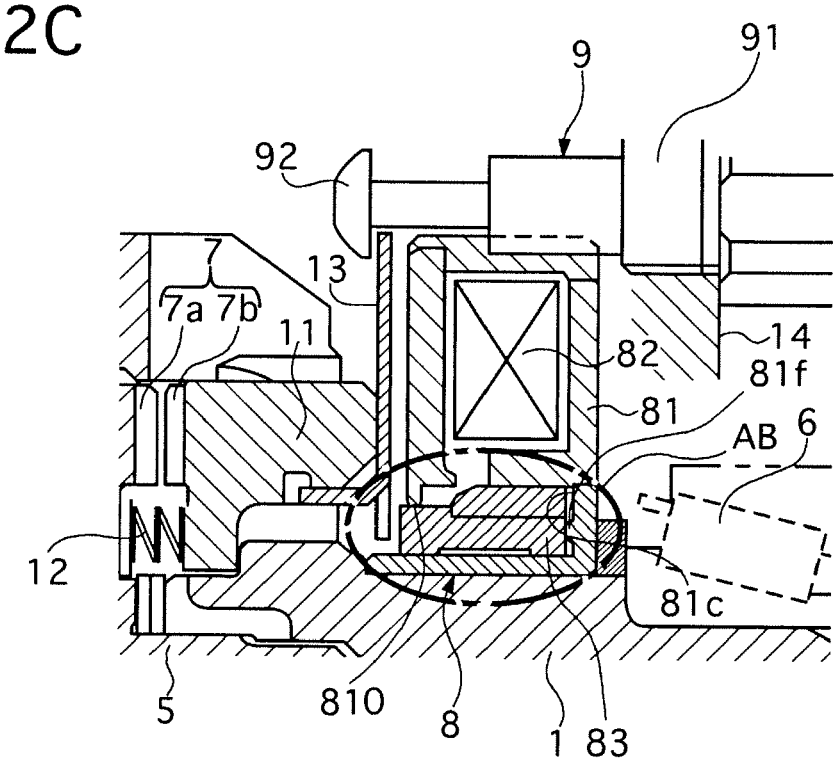
FIG. 2C is an enlarged cross sectional view showing a modification of the differential limit mechanism of the limit slip differential device shown in FIG. 2A.
Figure 2D:
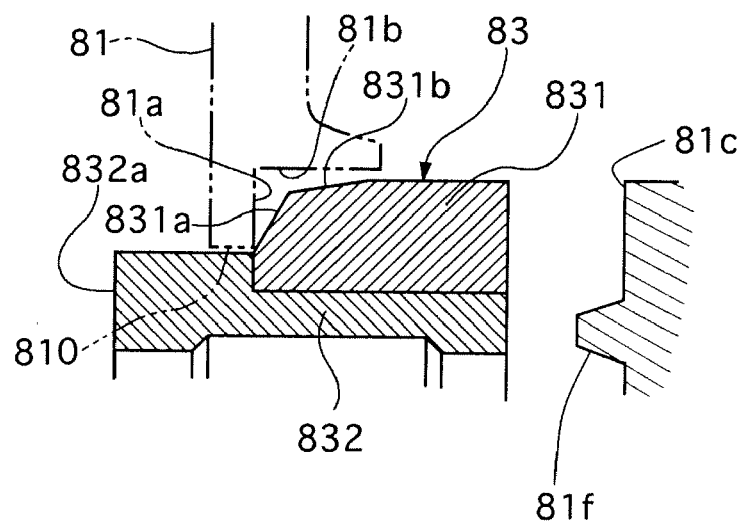
FIG. 2D is an enlarged view showing a part indicated by a circle area AB in FIG. 2C.

For example, in the differential lock state, a contacting member with which the plunger 83 contact may be other member, such as a peripheral part of the dog clutch or the electromagnetic solenoid, instead of the yoke 81. The contacting portion of the plunger 83 and its contacted part may be formed to have a curved surface, a groove, or the like. Although the plunger 83 is formed at its rear end with a circular projecting portion 832b, a circular projecting portion 81f may be formed on the rear wall portion 81c of the yoke 81 so as to be contactable to the plunger 83 with removing the circular projecting portion 832b of the plunger 83 as shown in FIGS. 2C and 2D.

The electromagnetic solenoid may have a structure different from that of the above described embodiments. The differential gears may be constructed by a planetary gear set, and a clutch for limiting the differential function may be constructed by other clutch instead of the dog clutch. The differential limit function may be performed to vary its thrust force according to a running condition of a motor vehicle.

The entire contents of Japanese Patent Application No. 2004-0409009 filed Feb. 25, 2003 is incorporated herein by reference.

What is claimed is:

1. A limited slip differential device comprising:
    differential gears for obtaining a differential function;
    a clutch for limiting the differential function of said differential gears;
    an electromagnetic solenoid that has a plunger which is capable of moving forward to engage said clutch in a differential limit state and moving backward to disengage said clutch in a differential limitless state, and a coil for applying electromagnetic force to said plunger when the coil is energized in the differential limit state, wherein said plunger is configured to be pressed by a return spring so that said clutch is disengaged; and
    a contacting member to which said plunger is contactable in at least one state of the differential limit state and the differential limitless state, wherein a contact area between said plunger and said contacting member is set smaller than a facing area between said plunger and said contacting member in the differential limit state, wherein said plunger has a tapered portion at a front end portion thereof, the tapered portion including a first steep tapered surface contactable to said contacting member in the differential limit state and a second gradual tapered surface configured to be separated from said contacting member in the differential limit state.

2. The limited slip differential device according to claim 1, wherein said plunger is formed with a circular projecting portion contactable to said contacting member in the differential limitless state.

3. The limited slip differential device according to claim 1, wherein said contacting member is formed with a circular projecting portion contactable to said plunger in the differential limitless state.

4. The limited slip differential device according to claim 1, wherein said clutch is a dog clutch that is engaged by electromagnetic force applied to said plunger in the differential limit state and disengaged by a spring force of the return spring in the differential limitless state.

5. The limited slip differential device according to claim 4, wherein said plunger is formed with a circular projecting portion contactable to said contacting member in the differential limitless state.

6. The limited slip differential device according to claim 4, wherein said contacting member is formed with a circular projecting portion contactable to said plunger in the differential limitless state.

7. The limited slip differential device according to claim 1, wherein said contacting member is a yoke of said electromagnetic solenoid.

8. The limited slip differential device according to claim 7, wherein said plunger is formed with a circular projecting portion contactable to said contacting member in the differential limitless state.

9. The limited slip differential device according to claim 7, wherein said contacting member is formed with a circular projecting portion contactable to said plunger in the differential limitless state.

* * * * *